United States Patent Office 3,527,749
Patented Sept. 8, 1970

3,527,749
HETEROCYCLIC 2,7-BISAZO DERIVATIVES
OF CHROMOTROPIC ACID
Břetislav Buděšínský and Dana Vrzalová, Prague, Czechoslovakia, assignors to Ceskoslovenska Akademie Ved, Prague, Czechoslovakia
No Drawing. Continuation-in-part of application Ser. No. 622,409, Mar. 13, 1967. This application Oct. 31, 1967, Ser. No. 679,505
Claims priority, application Czechoslovakia, Mar. 16, 1966, 1,712/66
Int. Cl. G09b 33/04; G01n 31/00
U.S. Cl. 260—155
7 Claims

ABSTRACT OF THE DISCLOSURE

A heterocyclic 2,7-bisazo derivative of chromotropic acid of the general formula

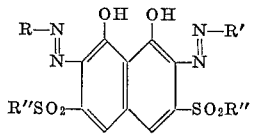

wherein R is

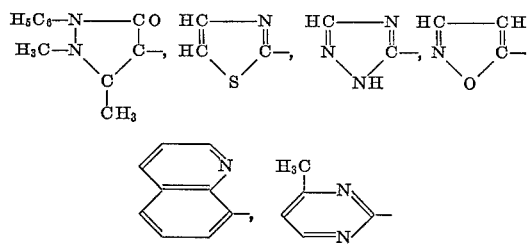

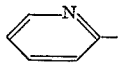

or

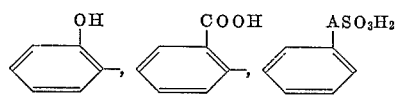

wherein R' is

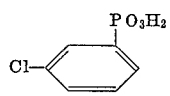

or

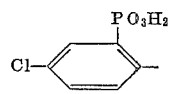

or is the same as R; and wherein R'' is —OH, —NH$_2$, —NH(CH$_2$)$_3$CH$_3$, —NH(CH$_2$)$_7$CH$_3$,

—NH(CH$_2$)$_{11}$CH$_3$ or "—NHC$_6$H$_5$."

The compounds are made by diazotizing a heterocyclic amine and then coupling the diazonium salt with the chromotropic acid or a derivative thereof.

CROSS-REFERENCES TO RELATED APPLICATIONS

This application is a continuation-in-part of application Ser. No. 622,409 filed by the same applicants on Mar. 13, 1967 and assigned to the same assignee as the present application, and now abandoned.

Reference is also made to the earlier application of one of the inventors of the present case, Budesinsky, together with another joint inventor Haas, Ser. No. 537,676, filed Mar. 28, 1966, and assigned to the same assignee as the present application, and relating to "2,7-Bisphenylazo Derivatives of Chromotropic Acid."

BACKGROUND OF THE INVENTION

In the just mentioned co-pending application Ser. No. 537,676, 2,7-bisphenylazo derivatives of chromotropic acid have been disclosed and a method of making them has been described. These compounds are important because of their metallochrome properties and are used as highly sensitive analytical reagents in the spectrophotometric determination of trace amounts of metals and also as visual indicators in complexometric titrations. They have, however, a specific range of color properties and a range of media of specific acidity where they can be used.

SUMMARY OF THE INVENTION

It is therefore an object of this invention to provide for analytical reagents of the type described which have different color properties and which can be used also in relatively weakly acidic media.

It is a more specific object of the invention to provide for reagents for the photometric determination of lanthanides, yttrium, gallium, indium and thallium.

These objects are accomplished by diazotizing a heterocyclic amine and then coupling the diazonium salt with the chromotropic acid or a derivative thereof to obtain a heterocyclic 2,7-bisazo derivative of chromotropic acid of the general formula

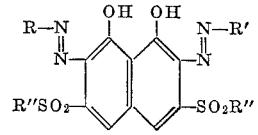

wherein R is

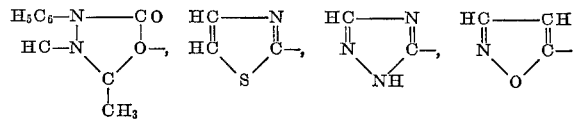

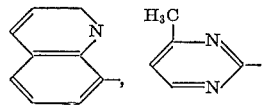

or

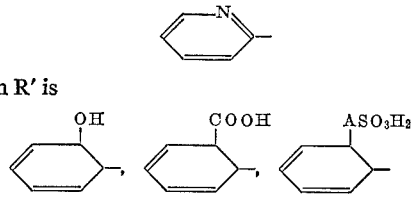

wherein R' is

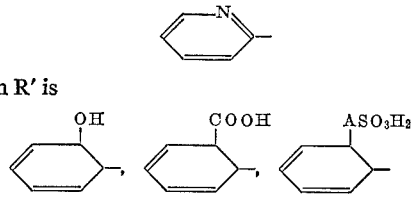

or or is the same as R; and wherein R'' is —OH, —NH$_2$, —NH(CH$_2$)$_3$CH$_3$, —NH(CH$_2$)$_7$CH$_3$,

—NH(CH$_2$)$_{11}$CH$_3$

—NH(CH$_2$)$_{17}$CH$_3$, or —NHC$_6$H$_5$. The invention also embraces the just defined class of compounds.

DESCRIPTION OF THE PREFERRED EMBODIMENTS

The introduction of a heterocyclic component in the 2,7-bisazo derivatives of chromotropic acid results in material changes of the color properties of the substances. A bathochrome effect occurs with these substances even in a comparatively weakly acidic medium (0.01 to 0.1 N mineral acid). In an alkaline medium, the bathochrome effect, on the other hand, is weak, and in a strongly alkaline medium (pH 13), it usually is associated with the decomposition of the compounds. The optimum metallochrome properties of the compounds of the invention, therefore, are found in the pH range from 4 to 11. This is the very range where the heretofore known metallochrome compounds did not have the properties as indicated.

For this reason the compounds of the invention are particularly useful in the photometric determination of lanthanides, yttrium, gallium, indium and thallium. They can also be used for complexometric titrations. Particularly the compounds having a sulfonamide group wherein the organic radical is the same as R″, as above indicated, are suitable extraction reagents in the photometric determination of trace amounts of the above metals.

The compounds of the invention may be made by coupling diazonium salts with chromotropic acid or its amides. The diazonium salts are formed by diazotizing primary amines of the desired heterocyclic compounds in an aqueous medium of dilute hydrochloric, perchloric or nitric acid with an aqueous solution of sodium or potassium nitrite. The acid may be used, for instance, in a 2–5 N solution. The amine and the nitrite are thoroughly mixed for the purpose of the reaction, with the temperature being maintained at a low level, preferably between —5 and +2° C.

With certain amines, such as 2-aminopyridine, the diazotizing reaction is carried out in a medium of absolute alcohol in the presence of a sodium alcoholate that may be formed during the reaction and using amyl nitrite as the diazotizing agent.

If there is a residue that does not go into solution during the diazotizing reaction, it is separated from the solution by filtration and application of suction. The thus formed diazonium salt solution at the indicated low temperature is then slowly dropped into an aqueous solution of chromotropic acid or of a diamide or phenylazo derivative of chromotropic acid. The solution should be saturated with calcium ions and have a pH between 9 and 11. This may be accomplished by suspending calcium oxide particles in the solution. The calcium ions may also be obtained by using calcium hydroxide. The solution may also contain pyridine or sodium hydroxide. The pyridine should be used in an amount between 5 and 20% of the total volume of the solution. The addition of the diazonium salt solution to the chromotropic acid solution must be effected at a very slow rate, that is, by dropwise addition, for instance at the rate of about 2 drops per second.

The reaction between the diazonium salt and chromotropic acid usually proceeds only with difficulty. These difficulties are even more marked than in the reaction forming the phenyldiazonium derivatives described in the above-mentioned co-pending application. It is therefore preferable to use the heterocyclic amine in an amount of a 2 to 5 times excess. Even with this precaution, undesirable side reactions may occur, with the result of color effects appearing other than those desired. Particularly, a brownish shade may form. This will occur particularly in case of a too rapid addition of the diazonium salt solution or in case of a disregard of the above-stated temperature limitations.

The side reactions also make it very difficult to provide for an accurate check of the formation of the desired 2,7-bisazo derivatives. However, with 2-phenylazo derivatives of chromotropic acid a reliable color check is usually possible in that the introduction of one drop of the final reaction solution into about 5 ml. of concentrated sulfuric acid will give a green color effect. This check reaction is particularly useful in the preparation of hetero- cyclic 2-phenylazo derivatives wherein R and R′, as above indicated, are the same.

After completion of the main reaction, the final product is precipitated by acidification. To obtain a product of the purity necessary for analysis purposes, the precipitation must usually be repeated three times by first acidifying the solution and then dissolving the precipitated product in sodium hydroxide.

Once products of desired purity are obtained they will have bright red and blue color shades and will be entirely free of any yellow-brown shade.

The following examples will further illustrate the invention without any intention of limiting its scope. In these examples, the common names of the individual compounds obtained have been indicated, following the nomenclature of the 2,7-bisphenylazo derivatives. Thus, in the compounds where R and R′ are the same (see the formula above given) and which contain an o-carboxyphenylazo group, the terms quinolylcarboxyazo and antipyrylcarboxyazo are, for instance, being used in Examples III and IV below. The designation DAL used below stands for dianilide.

Example I

Diantipyrylazo:

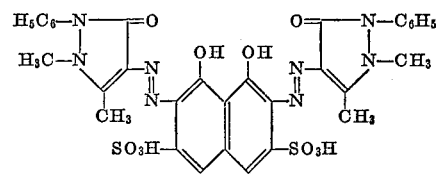

II 8.1 g. (0.04 m.) of 4-amino antipyrine was dissolved in 20 ml. of water and 5 ml. of conc. hydrochloric acid. The solution was cooled down to —5° C. and diazotized upon stirring with a solution of 2.8 g. of sodium nitrite in 10 ml. of water in a manner that the temperature did not exceed +2° C. Meanwhile a solution of 3.65 g. (0.01 m.) of chromotropic acid in 20 ml. of water and a suspension of 4 g. of calcium oxide, ground as finely as possible (free of carbonate), in 20 ml. of water were separately prepared. Both were mixed together and cooled down to —3° C. upon thorough mixing. The cooled solution of the diazoium salt was then added dropwise at the rate of approx. 2 drops/sec. in a manner that the temperature did not exceed +2° C. After the introduction had been completed, the reaction mixture was acidified with about 20 ml. of conc., hydrochloric acid. It was then placed over night in an ice-box. Afterwards, the residue was removed by suction and thoroughly washed with 10 ml. of 5% hydrochloric acid cooled down to 0° C. It was dried for 5 hours at 70° C., then dissolved in 200 ml. of 0.1 M sodium hydroxide, removed by suction from any undissolved residue and acidified with 10 ml. of conc. hydrochloric acid. This procedure was then repeated twice. Finally, the product was dried for 24 hours at 70° C. Thus 1.5–2.0 g. of the above product (i.e. 20–27% of the theoretical value) was obtained. In the range of pH 5–10, this compound is an excellent reagent for lanthanides and the elements of the third group.

Example II

Dithiazolylazo:

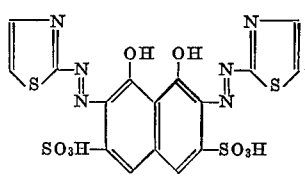

III 5.5 g. (0.04 m.) of 2-amino thiazol hydrochloride was dissolved in 20 ml. of water and 5 ml. of conc. hydrochloric acid. Further procedure was the same as in Example I. However, for dissolving the precipitated and dried product, 50 ml. of 1 M sodium hydroxide were sufficient. About 1–1.5 g. (i.e. 18–28% of the theoretical amount) were obtained. The product is a good spectrophotometric reagent for lanthanides and copper.

Example III

Quinolylcarboxyazo:

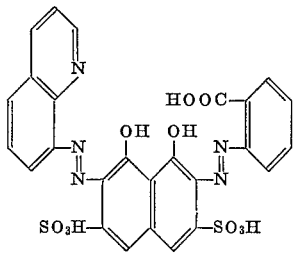

IV 2.9 g. (0.02 m.) of 8-amino quinoline was dissolved in 20 ml. of water and 5 ml. of conc. hydrochloric acid. The solution was cooled down to —2° C. and, upon stirring, a solution of 1.4 g. of sodium nitrite in 10 ml. of water was added dropwise in a manner that the temperature of the reaction solution did not exceed +3° C. After the reaction had been completed, the solution was removed by suction from any minor amount of undissolved residue, while observing all the time the above-given temperature limitations.

Meanwhile, a soltuion of 4.6 g. (0.01 m.) of 2-(o-carboxyphenylazo)-chromotropic acid in 20 ml. of water and 5 ml. of pyridine was separately prepared. Added to it was a suspension of 3 g. of finely ground calcium oxide (free of carbonate) in 20 ml. of water and the resulting mixture was cooled down to —5° C. The solution of the diazonium salt was then added to it dropwise at the rate of approx. 2 drops/sec. upon stirring and cooling in a manner that the temperature did not exceed +3° C. After the reaction had been completed, the mixture was immediately, under the same temperature conditions, acidified with 20 ml. of conc. hydrochloric acid. It was then left to stand over night in an ice-box. The precipitate was separated by suction and washed with 10 ml. of cooled (0° C.) 5% hydrochloric acid followed by drying for 5 hours at 70° C. It was thereupon dissolved in 50 ml. of 1 M sodium hydroxide, removed by suction from any undissolved residue. The filtrate was acidified with 10 ml. of conc. hydrochloric acid and left standing over night in an ice-box. It was then subjected to separation by suction, washed and dried in the manner indicated. This procedure was then repeated twice. Finally the compound was dried for 24 hours at 70° C. Thus 2.5–3 g. (i.e. 40–49% of the theoretical value) was obtained. The compound is a good reagent for thorium, lanthanides and copper.

Example IV

Antipyrylcarboxyazo:

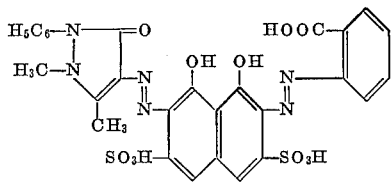

V 4.1 g. (0.02 m.) of 4-amino antipyrine was dissolved in 20 ml. of water and 5 ml. of conc. hydrochloric acid. The further procedure was the same as in Example III. 1.8–2.5 g. (i.e. 27–37% of the theoretical value) were obtained. The product is a good reagent for lanthanides and thorium.

Example V

Diantipyrylazo (DAL):

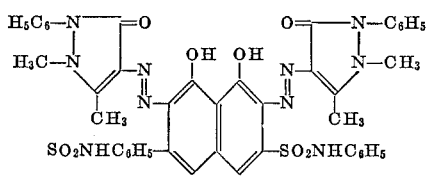

VI 8.1 g. (0.04 m.) of 4-amino antipyrine was dissolved in 20 ml. of water and 5 ml. of conc. hydrochloric acid. The solution was cooled down to —5° C. and, while stirring, a solution of 2.8 g. of sodium nitrite was added dropwise in a manner that the temperature did not exceed +2° C. The mixture was then placed in an ice-box for about 10 minutes. Meanwhile, a solution of 4.7 g. (0.01 m.) of dianilide of chromotropic acid in 20 ml. of pyridine and 200 ml. of water was separately prepared. To this solution were added 6 g. of finely ground calcium oxide (free of carbonate). The mixture was quickly cooled while stirring to —2° C. to —3° C. (at lower temperatures the dianilide would have crystallized out) and at this temperature the diazonium solution was first added dropwise upon mixing. The mixture was not permitted to foam excessively during the reaction and had to assume a dark red color quickly. After introduction of all the diazonium the solution was acidified at a temperature of —3° C. to 0° C. with 50 ml. of conc. hydrochloric acid. The mother liquor was immediately removed from the precipitate by suction and the precipitate was washed with 20 ml. of cold water and dried for 24 hours in a desiccator over phosphorus pentoxide at normal temperature. Thus about 2.5–3.0 g. of the above product (i.e. 28–33% of the theoretical value) was obtained. About 10 mg. of this compound dissolved in 10 ml. of n-butanol when reacted with 10 ml. of $2 \times 10^{-4}$ M cupric chloride resulted after 2–3 min. of thorough shaking in a blue-violet color. The compound is a good extraction-photometric reagent for copper and lanthanides.

Example VI

Dipyridylazo (DAL):

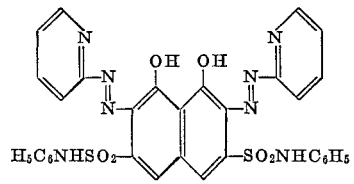

VII 1.2 g. of sodium metal was dissolved in 18 ml. of absolute ethanol. 4.7 g. (0.05 m.) of 2-amino-pyridine was separately dissolved in 20 ml. of absolute ethanol and mixed with the first solution. Then 6 g. of amyl nitrite was added to the total mixture and heated for 150 minutes on a water bath under a reflux condenser provided with a drying tube. After cooling down, a solution of 2.4 g. (0.005 m.) of dianilide of chromotropic acid in 20 ml. of absolute ethanol was added. The mixture was cooled down to 0° C. and bubbled through with a slow stream of dry carbon dioxide for a period of 3 hours in a manner that the temperature did not exceed +5° C. The resulting precipitate was separated by strong suction and dissolved in 25 ml. of 1 M sodium hydroxide, followed again by suction separation and filtration from any insoluble residue. The filtrate was acidified with 5 ml. of conc. hydrochloric acid. The resulting precipitate was again subjected to strong suction, washed with 10 ml. of cool water and dried for 24 hours in a desiccator over phosphorus pentoxide. Thus 0.8–1.2 g. of the above compound (i.e. 12–18% of the theoretical value) was obtained. The compound is a good extraction photometric reagent for copper, palladium and nickel.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:
1. A heterocyclic 2,7-bisazo derivative of chromotropic acid of the formula

wherein R is

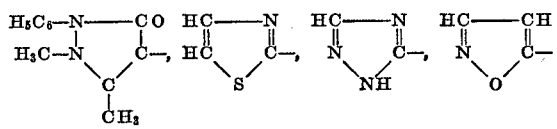

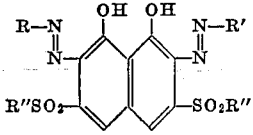

or

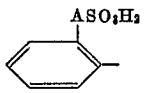

wherein R' is

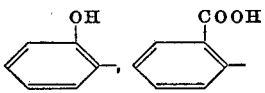

or

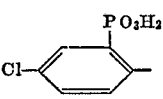

or

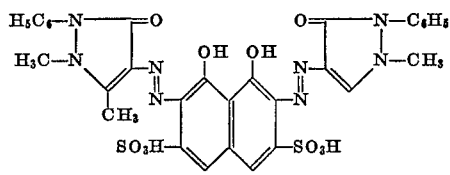

or is the same as R; and wherein R'' is —OH, —NH$_2$, —NH(CH$_2$)$_3$CH$_3$, —NH(CH$_2$)$_7$CH$_3$, —NH(CH$_2$)$_{11}$CH$_3$, —NH(CH$_2$)$_{17}$CH$_3$, or NH-phenyl.

2. The compound of claim 1, having the formula:

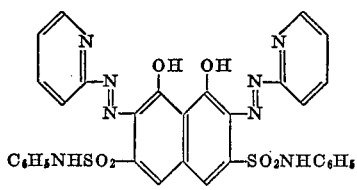

II

3. The compound of claim 1, having the formula:

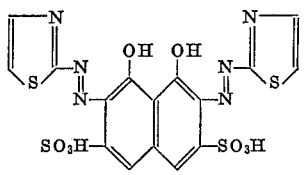

III

4. The compound of claim 1, having the formula:

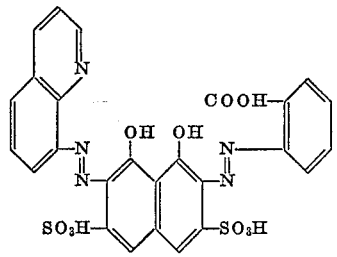

IV

5. The compound of claim 1, having the formula:

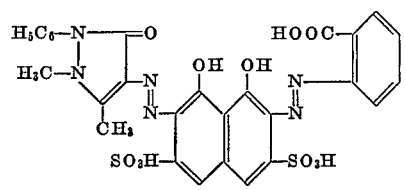

V

6. The compound of claim 1, having the formula:

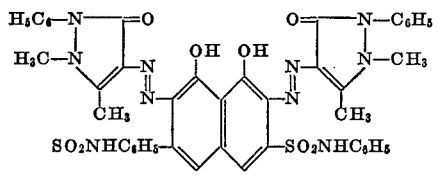

VI

7. The compound of claim 1, having the formula:

VII

References Cited

Kuznetsov et al.: Chem. Abstr., vol. 51, pp. 8708–8709 (1957).

Sommers et al.: Chem. Abstr., vol. 53, p. 6877 (1959).

FLOYD D. HIGEL, Primary Examiner

U.S. Cl. X.R.

23—230, 305; 260—154, 156, 157, 158, 160, 429